(12) United States Patent
Poissant et al.

(10) Patent No.: US 11,397,146 B2
(45) Date of Patent: Jul. 26, 2022

(54) VIBRATIONAL VISCOSIMETER

(71) Applicant: PAD PERIPHERAL ADVANCED DESIGN INC., Saint-Bruno-de-Montarville (CA)

(72) Inventors: Daniel Poissant, Mont-St-Hilaire (CA); Samuel Poissant, La Presentation (CA); Martin Gingras, Brossard (CA); Arnaud Derouet, Montreal (CA)

(73) Assignee: PAD PERIPHERAL ADVANCED DESIGN INC.

( * ) Notice: Subject to any disclaimer, the term of this patent is extended or adjusted under 35 U.S.C. 154(b) by 100 days.

(21) Appl. No.: 16/905,753

(22) Filed: Jun. 18, 2020

(65) Prior Publication Data
US 2020/0400543 A1 Dec. 24, 2020

Related U.S. Application Data

(60) Provisional application No. 62/863,488, filed on Jun. 19, 2019.

(51) Int. Cl.
*G01N 11/16* (2006.01)
(52) U.S. Cl.
CPC .................... *G01N 11/16* (2013.01)
(58) Field of Classification Search
CPC ....................................................... G01N 11/16
(Continued)

(56) References Cited

U.S. PATENT DOCUMENTS 3,349,604 A 10/1967 Banks
3,382,706 A 5/1968 Fitzgerald et al.
(Continued)

FOREIGN PATENT DOCUMENTS

EP 0282251 B1 12/2000
EP 2045594 B1 11/2017
(Continued)

*Primary Examiner* — Robert R Raevis
(74) *Attorney, Agent, or Firm* — Lavery, De Billy, LLP; Gwendoline Bruneau

(57) ABSTRACT

A viscosity measurement system and method, the system comprising a housing comprising a top cover and a bottom plate, a rod having a first end and a free end, and oscillation generating means, the oscillation generating means being connected through a supporting plate to the first end of the rod, the free end of the rod extending out of the bottom plate through an opening in the bottom plate; wherein the opening bottom in the bottom plate is sealed around the rod by at least one of: compression rings, bellows; a flexible circumferential part of the bottom plate around the opening; Tig welding of the rod to the opening in the bottom plate; and brazing of the rod to the opening in the bottom plate. The method comprises mounting an oscillation generating means connected to a first end of a rod within a housing comprising a top cover and a bottom plate, a free end of the rod extending out of the bottom plate through an opening in the bottom plate; and sealing the opening in the bottom plate around the rod by at least one of: compression rings, bellows; a flexible circumferential part of the bottom plate around the opening; Tig welding of the rod to the opening in the bottom plate; and brazing of the rod to the opening in the bottom plate.

11 Claims, 4 Drawing Sheets

(58) Field of Classification Search
USPC .............. 73/54.41, 24.01, 24.03–24.6, 32 A,
73/54.24–54.27; 33/556–561; 336/113
See application file for complete search history.

(56) References Cited

U.S. PATENT DOCUMENTS

| | | | |
|---|---|---|---|
| 3,636,753 A * | 1/1972 | Thiele .................... | G01N 11/10 |
| | | | 73/54.25 |
| 3,710,614 A | 1/1973 | Oppliger | |
| 3,712,117 A | 1/1973 | Fitzgerald et al. | |
| 3,762,429 A | 10/1973 | Fitzgerald et al. | |
| 4,566,181 A | 1/1986 | Matusik et al. | |
| 5,317,908 A | 6/1994 | Fitzgerald et al. | |
| 5,569,843 A | 10/1996 | Poissant | |
| 5,723,771 A * | 3/1998 | Miura ................... | G01N 11/162 |
| | | | 73/54.24 |
| 9,267,872 B2 | 2/2016 | Haeusler et al. | |
| 9,372,140 B2 | 6/2016 | Sneujink | |

FOREIGN PATENT DOCUMENTS

| | | |
|---|---|---|
| FR | 2462701 B1 | 2/1983 |
| WO | 1995013192 A1 | 5/1995 |
| WO | 1998009139 A1 | 3/1998 |

\* cited by examiner

VIBRATIONAL VISCOSIMETER

CROSS REFERENCE TO RELATED APPLICATIONS

This application claims benefit of U.S. provisional application Ser. No. 62/863,488, filed on Jun. 19, 2019. All documents above are incorporated herein in their entirety by reference.

FIELD OF THE INVENTION

The present invention relates to a viscosimeter.

BACKGROUND OF THE INVENTION

Vibrational viscometers use a powered vibrating rod to measure viscosity. Different fluids are more or less resistant to vibrations depending on how viscous they are. Therefore, by measuring the dampening of the vibration, or by measuring how quickly the vibration of the viscometer degrades, viscosity can be determined.

In viscosity measurement systems employing an oscillating element, the oscillating element is excited into oscillation by an excitation signal and the maximum amplitude of the oscillations of the oscillating element in response is detected. The resonance of the oscillating element, which is used to determine the viscosity of the product in which the oscillating element is immersed, corresponds to a given phase shift and an amplitude dampening between the excitation signal and the response signal.

In a number of industries, such as printing for example, the viscosimeter operates in harsh environments, and submitted to hydraulic perturbations and pump bursts that affect the vibration system.

There is still a need in the art for a vibrational viscosimeter.

SUMMARY OF THE INVENTION

More specifically, in accordance with the present invention, there is provided a viscosity measurement system, comprising a housing comprising a top cover and a bottom plate, a rod having a first end and a free end, and oscillation generating means, the oscillation generating means being connected through a supporting plate to the first end of the rod, the free end of the rod extending out of the bottom plate through an opening in the bottom plate; wherein the opening bottom in the bottom plate is sealed around the rod by at least one of: compression rings, bellows; a flexible circumferential part of the bottom plate around the opening; Tig welding of the rod to the opening in the bottom plate; and brazing of the rod to the opening in the bottom plate.

There is further provided a viscosity measurement method, comprising mounting an oscillation generating means connected to a first end of a rod within a housing comprising a top cover and a bottom plate, a free end of the rod extending out of the bottom plate through an opening in the bottom plate; and sealing the opening in the bottom plate around the rod by at least one of: compression rings, bellows; a flexible circumferential part of the bottom plate around the opening; Tig welding of the rod to the opening in the bottom plate; and brazing of the rod to the opening in the bottom plate.

Other objects, advantages and features of the present invention will become more apparent upon reading of the following non-restrictive description of specific embodiments thereof, given by way of example only with reference to the accompanying drawings.

DESCRIPTION OF EMBODIMENTS OF THE INVENTION

The present invention is illustrated in further details by the following non-limiting examples.

Vibrating viscosimeters comprise a vibrating rod, and measure the variation of the vibration amplitude of the rod according to the viscosity of the matter in which the rod is immersed. The rod vibration is performed magnetically. The vibration is triggered using a permanent magnet fixed at a first end of the vibrating rod and an excitation coil connected to an electrical oscillation circuitry via and amplifier. The detection is accomplished using a second coil or and Hall Effect sensor monitoring the vibration amplitude of the magnet. When the free end of the vibrating rod is immersed in the measured fluid and vibrational restriction occurs, the vibration amplitude is determined by the following formula:

$$\mu_p = K(Ea/Ex - C)^n$$

where K is a constant on the driving force and the displacement, $\mu$ is the viscosity of the fluid, $\rho$ is the density of the fluid, Ea is the rod vibration amplitude in air, Ex is the rod vibration amplitude in the measured fluid, and C is a constant derived from vibration parts.

The measured amplitude varies according to the fluid's viscosity. After K is calculated using a reference fluid for which the viscosity and density are already known, $\mu_p$ can be derived by comparing Ea with Ex.

The vibration system consists of a positive-feedback amplification circuit loop and the drive voltage from this amplifier remains constant at all times. The rod's vibration frequency is influenced by the fluid in which it is immersed. The amplitude of the vibration is damped according to the characteristics of the measured fluid and this change in amplitude is converted into a voltage by the detection circuitry. This voltage is amplified through a process of synchronous rectification and then output as the viscosity signal.

Figure 1:
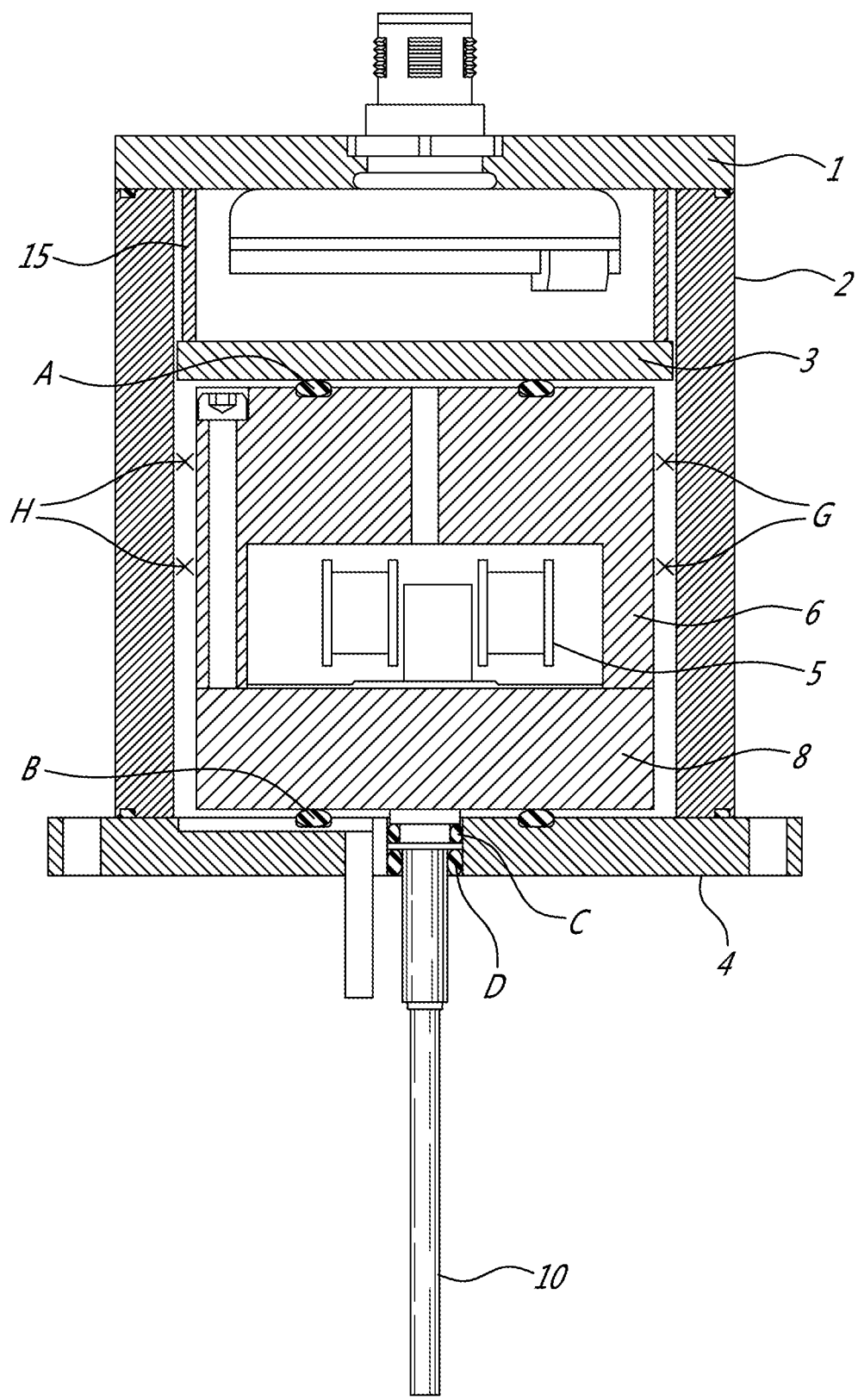
FIG. 1 is a schematic view of a measuring element according to an embodiment of an aspect of the present disclosure.
Figure 2:
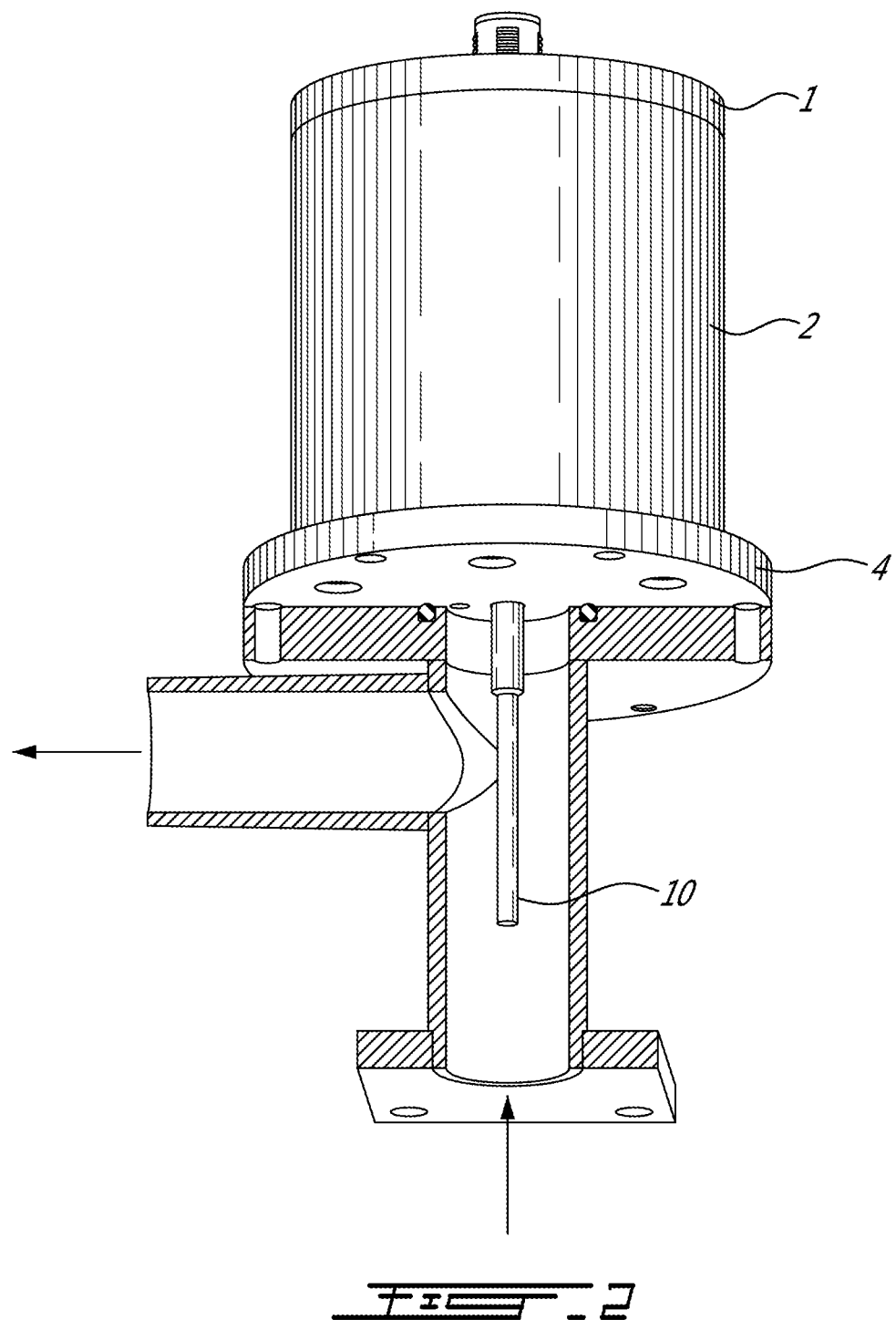
FIG. 2 is a schematic view of a system according to an embodiment of an aspect of the present disclosure.
Figure 3:
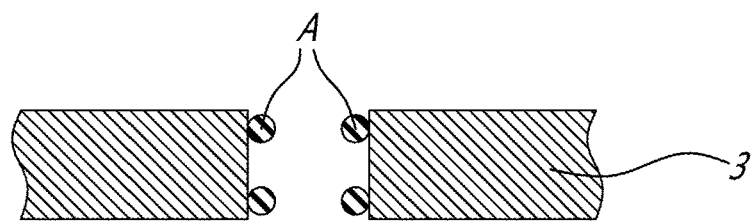
FIG. 3 show details of a housing according to an embodiment of an aspect of the present disclosure.
Figure 3:
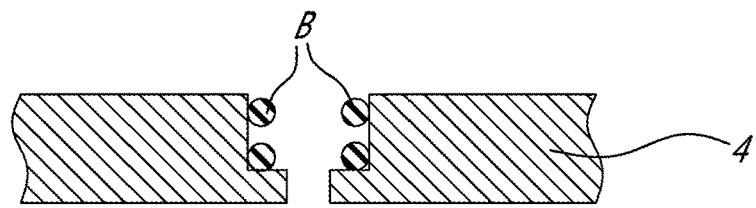
Figure 4:
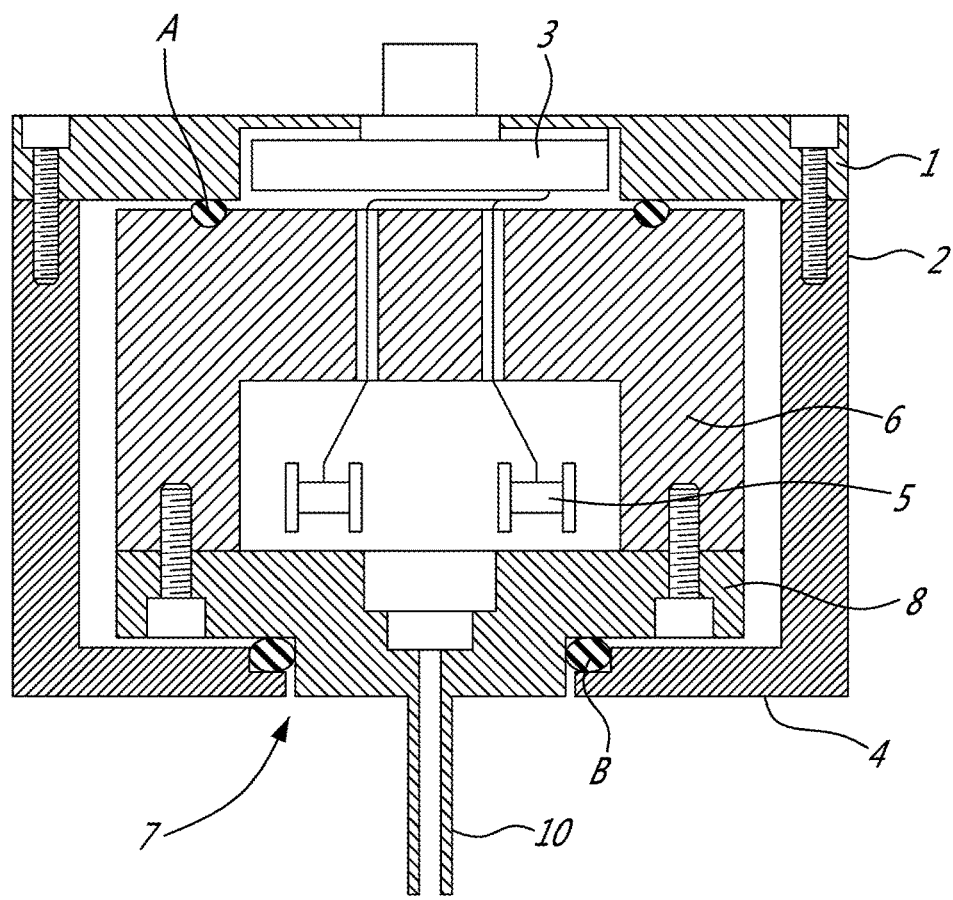
FIG. 4 is a schematic view of a measuring element according to an embodiment of an aspect of the present disclosure.

As schematically shown in FIG. 1, a system according to an embodiment of an aspect of the present disclosure comprises a measuring element in a housing. The housing is formed of a shell 2, a top cover 1 and a bottom plate 4. In the illustrated embodiment, a pressure plate 3 is connected to the bottom surface of the top cover 1 by cylinders for activation down to submit pressure on top of the bottom plate 4.

The measuring element comprises a rod 10 and forced oscillation generating means 5 connected to an electric board secured to the top cover 1. The oscillation generating means 5 is connected through a supporting plate 8 to a first end of a vibrating rod 10 for excitation of the vibrating rod 10. The vibrating rod 10 may thus be driven to its resonance frequency by the forced oscillation generating means 5 by the first end thereof.

A second free end of the rod 10, referred to as the passive end of the rod 10, extends out of the housing through an opening 7 in the bottom plate 4, for immersion, at least in part, in a fluid (not shown).

In the embodiment of FIG. 1, sealing of the opening bottom 7 of plate 4 around the rod 10 comprises O-rings C, D. O-rings D may be used or centering of the rod 10 within the opening 7 in the bottom plate 4.

Figure 5A:
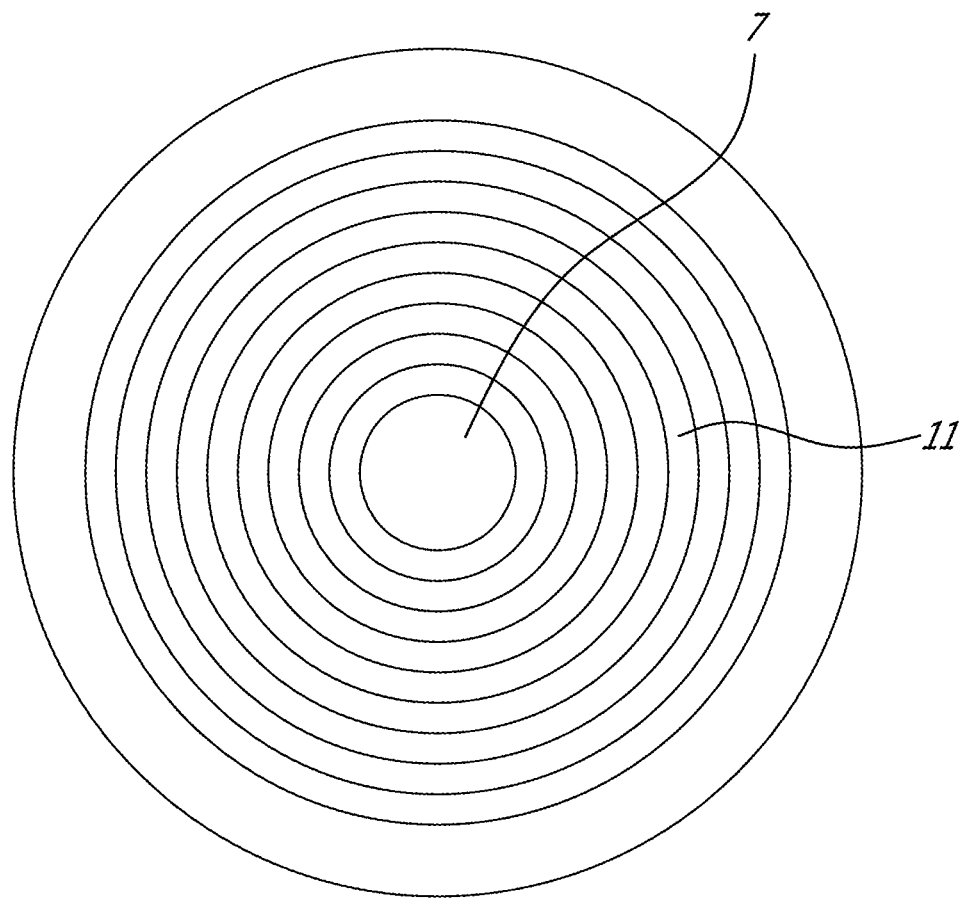
FIGS. 5A and 5B show examples of sealing of a measuring element according to an embodiment of an aspect of the present disclosure.
Figure 5B:
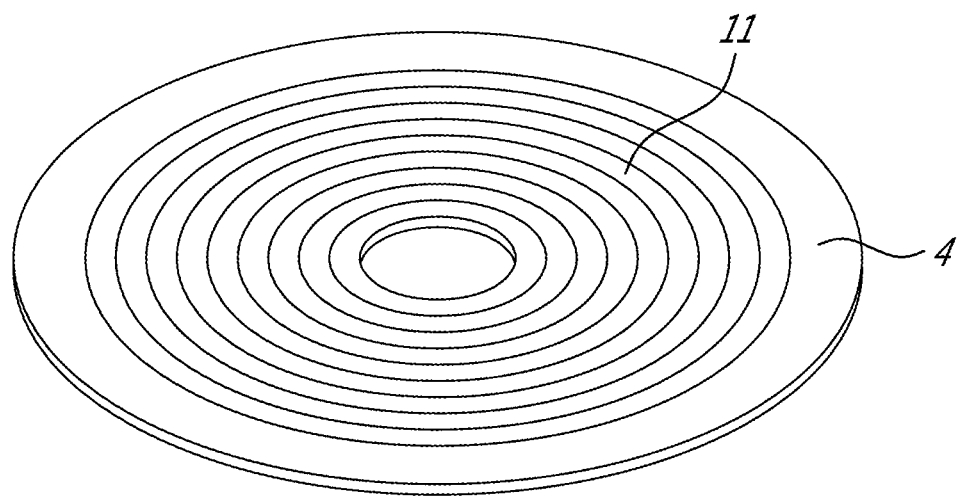

Alternatively, bellows 11 may be welded around the rod 10 (see FIG. 5), for sealing the opening 7 in the bottom plate 4 around the rod 10. Alternatively, the bottom plate 4 may comprise a flexible circumferential part around the opening 7 as a compliant part sealing the opening 7 in the bottom plate 4 around the rod 10. Still alternatively, Tig welding or brazing of the rod 10 to the opening 7 in the bottom plate 4 may ensure sealing of the opening 7 in the bottom plate 4 around the rod 10.

In hydraulic systems comprising piston pump or double diaphragm pumps for example, hydraulic turbulences may interfere with measurements of the measuring element. In the embodiment of FIG. 1, for isolation from such perturbations, the measuring element is suspended within the housing using top and bottom compression rings A and B mounting the measuring element in suspension between the pressure plate 3 and the bottom plate 4 respectively, and/or left and right compression rings G, H mounting the measuring element in suspension between opposite walls of the shell 2 respectively. Alternatively, the measuring element may be encapsulated in silicon or any elastomer between the pressure plate 3 and the bottom plate 4 within the housing. Still alternatively, the measuring element may be glued or welded to the bottom plate 4, in such a way that the shell 2 acts as a shock absorber thereby sheltering the measuring element from the pulsation of the fluid to be measured.

The shape and size of the opening 7 in the bottom plate 4 is selected according to both issues of sealing of the bottom plate 4 for protection of the measuring element against the environment and of isolation of the measuring element from hydraulic perturbations. The bottom O-rings or other sealing of the opening 7 around the rod 10 is selected and positioned to resist displacement under pressure burst for example. The measuring element, thus shielded from external vibrations, only reacts to the vibrations of the passive end of the rod immersed in the fluid to be measured, for accurate, reliable and repeatable fluid characteristics measurements.

A corrosion-resistant material, such as stainless steel, titanium, Hastelloy® and teflon, for example, may be selected as a material for the vibrating rod in contact with the fluid, depending of the fluid.

The present system provides reliable, repeatable and continuous measurements of viscosity of the fluid to be measured, in a range from less than 1 CPS to several millions CPS (centipoise), in harsh environment, with pressures up to 100 psi (6.9 Bar) and more, fin environments categorised as non-hazardous areas up to hazardous areas Zone 0 Ex is (intrinsically safe) and Ex Ga (explosion proof), in a range of temperatures, including typical range but not limited to between 0 and 50° C.

A number of mounting options may be considered for the system, including bench top or in situ using side bracket, base mount, pipe attachment such as strut channel pipe clamp for example.

The scope of the claims should not be limited by the embodiments set forth in the examples, but should be given the broadest interpretation consistent with the description as a whole.

What is claimed is:

1. A viscosity measurement system, comprising:
    a housing comprising a top cover and a bottom plate;
    a rod having a first end and a free end; and
    a vibrator connected to the first end of the rod, the free end of the rod extending out of the housing through an opening in the bottom plate;
    wherein the opening in the bottom plate is sealed around the rod by one of: compression rings, bellows; a flexible circumferential part of the bottom plate; welding; and brazing; and
    wherein the vibrator is mounted within the housing by top and bottom compression rings.

2. The system of claim 1, wherein the housing further comprises a pressure plate connected to the top cover and configured for activation to submit pressure on top of the bottom plate.

3. The system of claim 1, wherein the housing further comprises a pressure plate connected to the top cover and configured for activation to submit pressure on top of the bottom plate, and the rod connected to the vibrator is supported between the pressure plate and the bottom plate.

4. The system of claim 1, comprising a compression ring centering the rod within the opening in the bottom plate.

5. A viscosity measurement system, comprising:
    a housing comprising a top cover and a bottom plate;
    a rod having a first end and a free end; and
    a vibrator connected to the first end of the rod, the free end of the rod extending out of the housing through an opening in the bottom plate;
    wherein the opening in the bottom plate is sealed around the rod by one of: compression rings, bellows; a flexible circumferential part of the bottom plate; welding; and brazing; and
    wherein the vibrator is mounted within the housing between opposite walls of the shell by compression rings.

6. A viscosity measurement system, comprising:
    a housing comprising a top cover and a bottom plate;
    a rod having a first end and a free end; and
    a vibrator connected to the first end of the rod, the free end of the rod extending out of the housing through an opening in the bottom plate;
    wherein the opening in the bottom plate is sealed around the rod by one of: compression rings, bellows; a flexible circumferential part of the bottom plate; welding; and brazing; and
    wherein the housing further comprises a pressure plate connected to the top cover and configured for activation to submit pressure on top of the bottom plate, and the vibrator is mounted between the pressure plate and the bottom plate by compression rings.

7. The system of claim 6, comprising a compression ring centering the rod within the opening in the bottom plate.

8. The system of claim 6, wherein the housing further comprises a pressure plate connected to the top cover and configured for activation to submit pressure on top of the bottom plate.

9. The system of claim 6, wherein the housing further comprises a pressure plate connected to the top cover and configured for activation to submit pressure on top of the bottom plate, and the vibrator is supported between the pressure plate and the bottom plate.

10. A viscosity measurement system, comprising:
a housing comprising a top cover and a bottom plate;
a rod having a first end and a free end; and
a vibrator connected to the first end of the rod, the free end of the rod extending out of the housing through an opening in the bottom plate;
wherein the opening in the bottom plate is sealed around the rod by one of: compression rings, bellows; a flexible circumferential part of the bottom plate; welding; and brazing; and
wherein the vibrator is one of: encapsulated in an elastomer within the housing, and glued and welded to the bottom plate.

11. The system of claim 10, comprising a compression ring centering the rod within the opening in the bottom plate.

* * * * *